Aug. 23, 1949.    D. J. PARRIS    2,479,771
OPEN PAN EVAPORATOR
Filed Feb. 14, 1947
FIG_1_
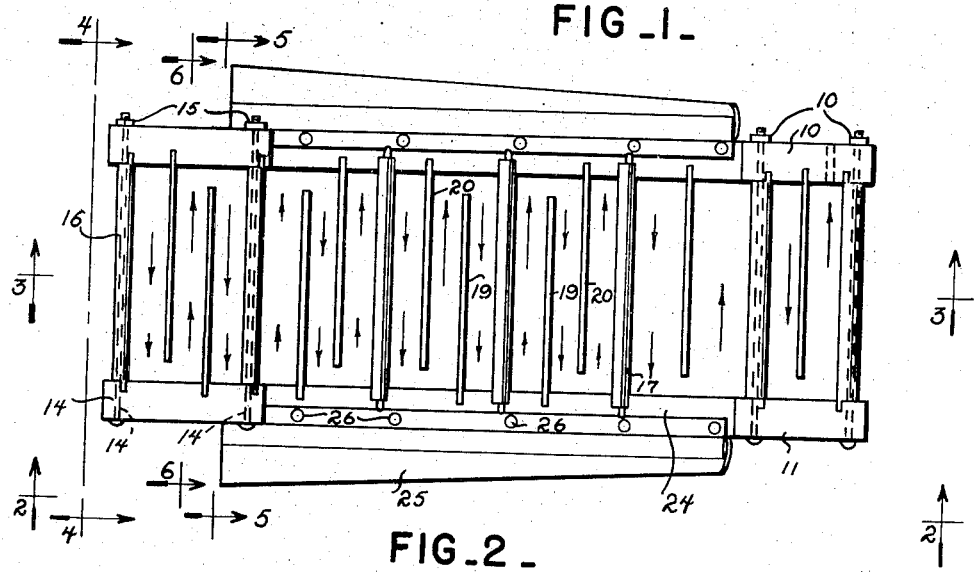
FIG_2_
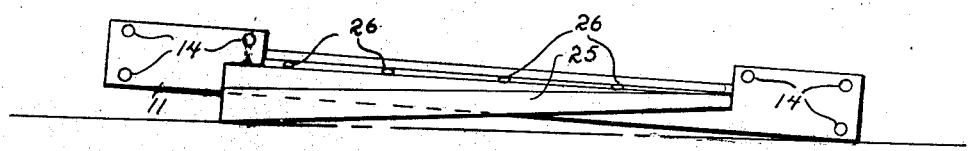
FIG_3_
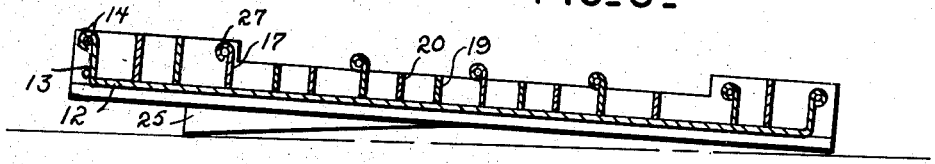
FIG_4_
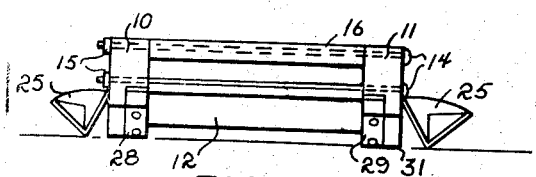
FIG_5_
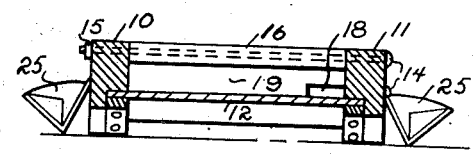
FIG_6_
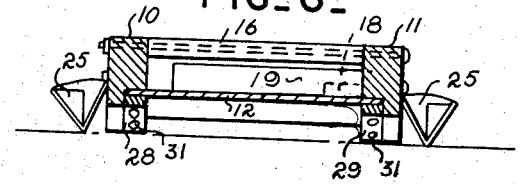
*INVENTOR.*
DOCTOR J. PARRIS
BY *Victor J. Evans & Co.*
ATTORNEYS Patented Aug. 23, 1949

2,479,771

UNITED STATES PATENT OFFICE 2,479,771

OPEN PAN EVAPORATOR

Doctor J. Parris, Gaffney, S. C.

Application February 14, 1947, Serial No. 728,583

1 Claim. (Cl. 159—42)

This invention relates to evaporators particularly adaptable for the treating of syrup, vegetable juices and the like.

It is an object of the present invention to provide an evaporator whereby the scum which forms upon the boiling liquids can be removed without the necessity of manual labor.

Other objects of the present invention are to provide an evaporator particularly adaptable for boiling syrup which is of simple construction, inexpensive to manufacture and maintain and efficient in operation.

For other objects and for a better understanding of the invention, reference may be had to the following detailed description taken in connection with the accompanying drawing, in which Fig. 1 is a top plan view of my evaporator embodying the features of the present invention.

Fig. 2 is a side elevational view and

Fig. 3 is a longitudinal cross-sectional view taken on line 3—3 of Fig. 1 and looking in the direction of the arrows thereof.

Fig. 4 is an end elevational view taken on line 4—4 and looking in the direction of its arrows.

Figs. 5 and 6 are respectively transverse cross-sectional views taken respectively on lines 5—5 and 6—6 of Fig. 1 and looking respectively in the direction of the arrows thereof.

Referring now to the figures, 10 and 11 are respectively side frame pieces on which is suspended a pan 12 extending between the pieces and from one end to the other. The opposite ends of the pan are extended upwardly as indicated at 13 and are turned over a transversely extending rod 14 connected between the side pieces and secured in place by a clamping nut 15. This turned over formation is shown at 16. Other partitions 17 are disposed at intervals throughout the length of the pan and are similarly secured to the side pieces by the provision of bolts 14'. In order to permit the flow of the syrup past these partitions 17, there is provided in each of the partitions and in one corner thereof an opening 18. Between the partitions 17 are other partitions 19 and 20, each of which are of less length than the width of the pan and are secured respectively to but one side piece whereby to provide a continuous passage around the ends of the partitions. The pieces and the pan formation 12 are raised at one end whereby to provide a gentle slope to the evaporator. The juices to be treated are delivered to one end of the evaporator and will flow downwardly until they have become changed into a syrup. Beneath the pan there is provided a heater which will maintain the juices to a boiling temperature.

The pieces 10 and 11 are recessed on their upper edges as indicated at 24 within which there are connected drain pans 25. The scum formed in spaces 26 between partitions will overflow the side pieces and pass to the drains 25 beneath which can be disposed a container for finally removing the scum from the evaporator. The drains 25 are inclined in the opposite direction from which the pan and side pieces are inclined. The drains 25 are secured within the recesses 24 of the pieces by longitudinally spaced fastening screws 26. The curve or turned over portions on the partition 17 are indicated at 27 and these partitions 17 are preferably welded or secured to the pan 12. The ends of the partition are fitted within recesses in the side faces of the longitudinal side pieces whereby to give stability to the partition. The pan 12 is fixed as more clearly shown in Figs. 4, 5 and 6 to the side pieces within recesses 28 in their bottom edges and made secure by clamping plates 29 fitted within the recesses and fastened by screws 31 to the side pieces.

Having now described my invention, I claim:

An evaporator comprising a pair of side frame pieces, a sheet metal pan extending lengthwise of said frame pieces and secured to the same, a plurality of rods having the opposite ends thereof anchored to said side frame pieces, respectively, said rods being spaced lengthwise of said side frame pieces and transversely thereof, a plurality of primary partitions secured to said rods and depending therefrom into fluid-tight relationship with said pan and side frame pieces, each said primary partition with the exception of the end partitions being provided with an opening adjacent said pan, a pair of intermediate partitions between adjacent pairs of said primary partitions, said intermediate partitions each having a length shorter than the distance between said side frame pieces by a predetermined amount and extending from said side frame pieces, respectively, the openings in the primary partitions and the spacings between the ends of said intermediate partitions and adjacent side frame pieces being alternatively arranged to provide a circuitous path for liquid, said side frames intermediate the ends thereof having a recess, and drain troughs attached to said side frame pieces at said recesses and depending from said side frame pieces, said troughs receiving the liquid overflow through said recesses, the longitudinal axes of said pan and said troughs being angularly displaced in opposite directions relative to each other whereby when said evaporator is placed upon a support said troughs will raise one end of said pan resulting in said troughs and pan being tilted in opposite directions to thereby cause liquid introduced in higher end of evaporator to follow a circuitous path toward the lower end of the evaporator.

DOCTOR J. PARRIS.

REFERENCES CITED

The following references are of record in the file of this patent:

UNITED STATES PATENTS

| Number | Name | Date |
|---|---|---|
| 193,539 | Miller | July 24, 1877 |
| 206,532 | Brooks | July 30, 1878 |
| 813,089 | Golden | Feb. 20, 1906 |
| 1,175,733 | Everton | Mar. 14, 1916 |
| 1,248,237 | Yoder | Nov. 27, 1917 |
| 2,435,153 | Myrick | Jan. 27, 1948 |